(12) United States Patent
Lim

(10) Patent No.: US 12,423,430 B2
(45) Date of Patent: Sep. 23, 2025

(54) FIRMWARE UPDATE METHOD AND APPARATUS FOR A MCU OF A VEHICLE

(71) Applicant: HYUNDAI AUTOEVER CORP., Seoul (KR)

(72) Inventor: JaeHyun Lim, Seoul (KR)

(73) Assignee: HYUNDAI MOTOR CORP., Seoul (KR)

( * ) Notice: Subject to any disclaimer, the term of this patent is extended or adjusted under 35 U.S.C. 154(b) by 203 days.

(21) Appl. No.: 18/237,128

(22) Filed: Aug. 23, 2023

(65) Prior Publication Data
US 2024/0070282 A1 Feb. 29, 2024

(30) Foreign Application Priority Data
Aug. 24, 2022 (KR) .......... 10-2022-0106171

(51) Int. Cl.
G06F 21/50 (2013.01)
G06F 21/57 (2013.01)
(Continued)

(52) U.S. Cl.
CPC .......... G06F 21/572 (2013.01); H04L 9/0816 (2013.01); H04L 9/3242 (2013.01)

(58) Field of Classification Search
CPC .......................................... G06F 21/50
See application file for complete search history.

(56) References Cited

U.S. PATENT DOCUMENTS 5,452,339 A * 9/1995 Siu .......... H04M 3/30
379/22
10,235,152 B2 * 3/2019 Linn .......... G06F 8/65
(Continued)

FOREIGN PATENT DOCUMENTS

KR 100780362 B1 11/2007
KR 101425224 B1 7/2014
(Continued)

OTHER PUBLICATIONS

Office Action cited in corresponding Korean patent application No. 10-2022-0106171; Jun. 27, 2024; 12 pp.

Primary Examiner — Jae U Jeon
(74) Attorney, Agent, or Firm — Lempia Summerfield Katz LLC

(57) ABSTRACT

A firmware update method includes requesting a hardware security module (HSM) to store version information of a current firmware stored in a flash memory and storing, by the HSM, the version information of the current firmware. The firmware update method also includes erasing the flash memory when the version information of the current firmware is stored by the HSM and writing new downloaded firmware to the flash memory; verifying an integrity of the new firmware. The firmware update method further includes requesting the HSM to sense downgrade of the new firmware when the integrity is verified. The firmware update method additionally includes determining, by the HSM, whether the firmware is downgraded by comparing the stored version information and the version information of the new firmware. The firmware update method also includes confirming a reprogramming success when it is determined that the firmware is not downgraded by the HSM.

15 Claims, 10 Drawing Sheets

(51) Int. Cl.
*H04L 9/08* (2006.01)
*H04L 9/32* (2006.01)

(56) References Cited

U.S. PATENT DOCUMENTS

| | | |
|---|---|---|
| 11,409,879 B2 | 8/2022 | Park et al. |
| 11,783,041 B2 | 10/2023 | Park et al. |
| 2008/0104398 A1 | 5/2008 | Cho et al. |
| 2014/0307540 A1* | 10/2014 | Duda ............... H04L 41/082 |
| | | 370/220 |
| 2021/0216638 A1 | 7/2021 | Park et al. |
| 2022/0382871 A1 | 12/2022 | Park et al. |
| 2023/0222206 A1* | 7/2023 | Wang ............... G06F 21/6218 |
| 2023/0315432 A1* | 10/2023 | Chabaud ............ G06F 21/572 |
| | | 717/168 |

FOREIGN PATENT DOCUMENTS

| | | |
|---|---|---|
| KR | 102254146 B1 | 5/2021 |
| KR | 20210091585 A | 7/2021 |

* cited by examiner

FIRMWARE UPDATE METHOD AND APPARATUS FOR A MCU OF A VEHICLE

CROSS-REFERENCE TO RELATED APPLICATIONS

This application claims the benefit of and priority to Korean Patent Application No. 10-2022-0106171, filed in the Korean Intellectual Property Office on Aug. 24, 2022, the entire contents of which are incorporated herein by reference.

TECHNICAL FIELD

The present disclosure relates to a method and apparatus for firmware update for a micro controller unit (MCU) of a vehicle.

BACKGROUND

With recent technological development, various electronic devices for user convenience have been developed for vehicles. Further, an update (also referred to as 'reprogramming') technology for updating firmware of a micro controller unit (MCU) mounted on a vehicular controller for controlling various electronic devices is being developed. In recent firmware update applications, a technology has been employed to prevent a firmware downgrade attack in which an attacker attempts to update firmware to a lower version than a current firmware version.

The firmware of the MCU is typically stored in a flash memory, and the update of the firmware is performed by a flash bootloader. Due to characteristics of the flash memory, the flash bootloader downloads the firmware after flash erase. Because version information of the firmware is located in the firmware, it may not be possible to determine the version information until the firmware is downloaded to the MCU from a diagnostic device. Therefore, a version of firmware currently stored in a flash memory is typically read and stored in a volatile memory (RAM) as a current version, and the current version and a new version of a downloaded firmware are compared to determine whether the firmware is downgraded.

We have found that when in the process of updating firmware, an unintentional battery-off situation occurs and data stored in a RAM is erased, there is a problem in that current version information of the firmware is lost and whether the firmware is downgraded cannot be determined.

An example is a case in which the battery-off occurs before firmware is downloaded after flash erase. In this case, no version information remains either in the RAM or in the flash memory. Another example is a case in which the firmware is downloaded after the flash erase, but version downgrade is determined. In this case, because wrong firmware is downloaded, the version of the firmware stored in the current flash memory is not reliable, and a previous version before downloading should be recognized as the current version for next firmware update. However, there is no method to recognize the previous version before downloading the previous version as the current version. Yet another example is a case in which the firmware is downloaded after the flash erase and it is confirmed even that the version downgrade does not occur, but the battery-off occurs before firmware integrity verification (signature verification) is performed. In this case, because version information in firmware for which integrity is not verified is not reliable, the previous version before downloading should be recognized as the current version for the next firmware update, but there is no method to recognize the previous version before downloading the previous version as the current version.

SUMMARY

Embodiments of the present disclosure provide a method and an apparatus for firmware update which accurately recognize a current version of firmware to prevent a firmware downgrade attack even when an unintended battery-off situation occurs in the process of updating firmware.

The object to be achieved by the present disclosure is not limited to the aforementioned object, and other objects, which are not mentioned above, should be clearly understood by a person having ordinary skill in the art to which the present disclosure pertains from the following description.

In an embodiment of the present disclosure, a firmware update method is provided. The firmware update method includes requesting a hardware security module (HSM) to store version information of a current firmware stored in a flash memory. The firmware update method also includes storing, by the HSM, the version information of the current firmware. The firmware update method further includes erasing the flash memory when the version information of the current firmware is stored by the HSM. The firmware update method additionally includes writing new downloaded firmware to the flash memory. The firmware update method further still includes verifying an integrity of the new firmware. The firmware update method also includes requesting the HSM to sense downgrade of the new firmware when the integrity is verified. The firmware update method further yet includes determining, by the HSM, whether the firmware is downgraded by comparing the stored version information and the version information of the new firmware. The firmware update method also includes confirming a reprogramming success when it is determined that the firmware is not downgraded by the HSM.

The firmware update method may further include erasing the flash memory when it is determined that the firmware is downgraded by the HSM.

The firmware update method may further include erasing the flash memory when the integrity is not verified.

Storing the version information of the current firmware by the HSM may include storing the version information of the current firmware in a secure storage.

The firmware update method may further include, prior to storing the version information of the current firmware by the HSM, verifying, by the HSM, validity of the version information of the current firmware.

The firmware update method may further include, prior to determining whether the firmware is downgraded by the HSM, verifying, by the HSM, the validity of version information of the new firmware.

The version information may include a version value, a salt value, a message authentication code (MAC), and a pre-shared key (PSK) index. The HSM may verify the validity of the version information by using PSKs corresponding to the version value, the salt value, the MAC, and the PSK index.

In another embodiment of the present disclosure, a firmware update apparatus is provided. The firmware update apparatus includes a host core configured to perform firmware update of a flash memory. The firmware update apparatus also includes a hardware security module (HSM). The host core is configured to request the HSM to store version information of current firmware stored in the flash memory when requesting the firmware update. The HSM is configured to store the version information of the current firmware in response to the request of the host core. The host core is configured to, when the version information of the current firmware is stored by the HSM, erase the flash memory, write new firmware downloaded to the flash memory, verify an integrity of the new firmware, and request the HSM to sense downgrade of the new firmware when the integrity is verified. The HSM is configured to determine whether the firmware is downgraded by comparing the stored version information and the version information of the new firmware. The host core is configured to confirm a reprogramming success when it is determined that the firmware is not downgraded by the HSM.

The host core may be configured to erase the flash memory when it is determined that the firmware is downgraded by the HSM.

The host core may be configured to erase the flash memory when the integrity is not verified.

The HSM may be configured to store the version information of the current firmware in a secure storage.

The HSM may be configured to, prior to storing the version information of the current firmware, verify validity of the version information of the current firmware.

The HSM may be configured to, prior to determining whether the firmware is downgraded, verify validity of version information of the new firmware.

The version information may include a version, a salt value, a message authentication code (MAC), and a pre-shared key (PSK) index. The HSM may be configured to verify the validity of the version information by using PSKs corresponding to the version, the salt value, the MAC, and the PSK index.

The host core may be configured to erase the flash memory without requesting the HSM to store the version information of the current firmware stored in the flash memory if reprogramming is unsuccessful in previous firmware update when the firmware update is requested.

According to an embodiment of the present disclosure, an HSM provided in an MCU of a vehicle stores version information of current firmware and determines whether the current firmware is downgraded by comparing with version information of new firmware to prevent a firmware downgrade attack by correctly recognizing the current version of the firmware even though an unintended battery-off situation occurs in the process of updating the firmware.

The foregoing summary is illustrative only and is not intended to be in any way limiting. In addition to the illustrative aspects, embodiments, and features described above, further aspects, embodiments, and features should become apparent to those having ordinary skill in the art from the following description and the accompanying drawings.

BRIEF DESCRIPTION OF THE DRAWINGS

In order that the disclosure may be well understood, there are now described various forms thereof, given by way of example, reference being made to the accompanying drawings.

Figure 1:
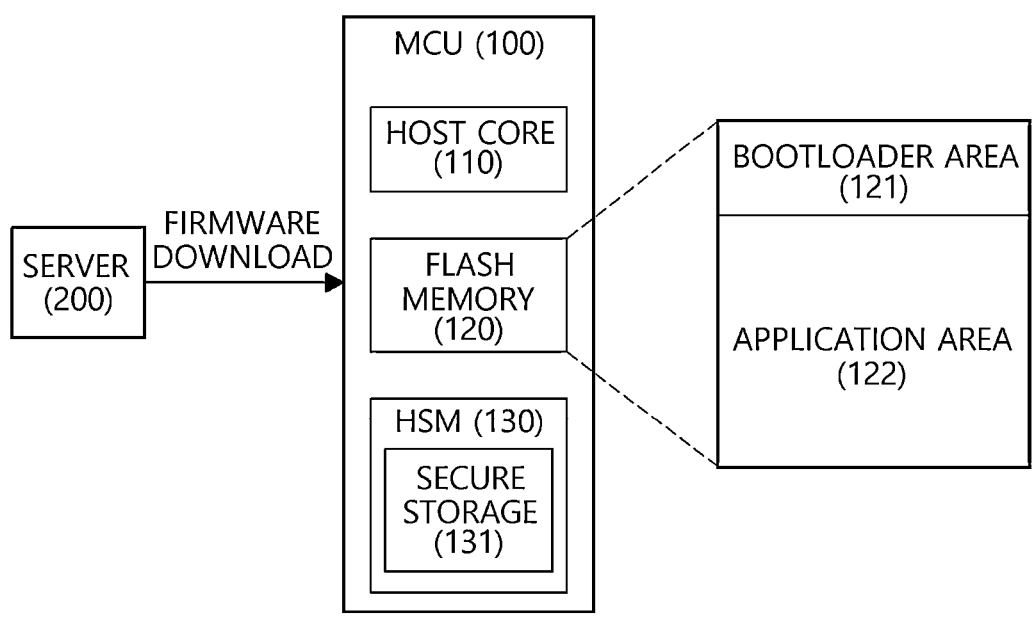
FIG. 1 illustrates a configuration of a firmware update apparatus, according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes may be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. In the following descriptions and the accompanying drawings, substantially the same components are represented by the same reference numerals, and the duplicate description has been omitted. Further, in the following description, a detailed explanation of a known related function or configuration may be omitted to avoid unnecessarily obscuring the subject matter of the present disclosure.

In the following description, when a component, device, element, or the like of the present disclosure is described as having a purpose or performing an operation, function, or the like, the component, device, or element should be considered herein as being "configured to" meet that purpose or perform that operation or function.

FIG. 1 illustrates a configuration of a firmware update apparatus, according to an embodiment of the present disclosure.

The firmware update apparatus according to an embodiment of the present disclosure may be implemented in a micro controller unit (MCU) 100 of a vehicle. The MCU 100 may download firmware from a server 200. In some embodiments, the MCU 100 may download the firmware via a vehicular gateway (not illustrated).

The firmware update apparatus includes a host core 110, a flash memory 120, and a hardware security module (HSM) 130.

The host core 110 executes instructions of a program stored in the flash memory 120.

The flash memory 120 includes a bootloader area 121 and an application area 122. The bootloader area 121 stores a flash bootloader. The application area 122 stores the firmware. The flash bootloader serves to update the firmware stored in the application area 122.

The HSM 130 may be a module included in the MCU 100 due the importance of security. Encryption related components are implemented as hardware inside the HSM 130, so encryption and decryption are possible within a short time. Further, the HSM 130 possesses a secure storage 131 implemented as a data flash. In an embodiment of the present disclosure, the version information of the firmware stored in the flash memory 120 is not stored in a RAM (not illustrated), and the HSM 130 stores the version information of the firmware and determines whether the current firmware is downgraded by comparing with version information of new firmware to prevent a firmware downgrade attack by correctly recognizing the current version of the firmware even when an unintended battery-off situation occurs in the process of updating the firmware.

Figure 2:
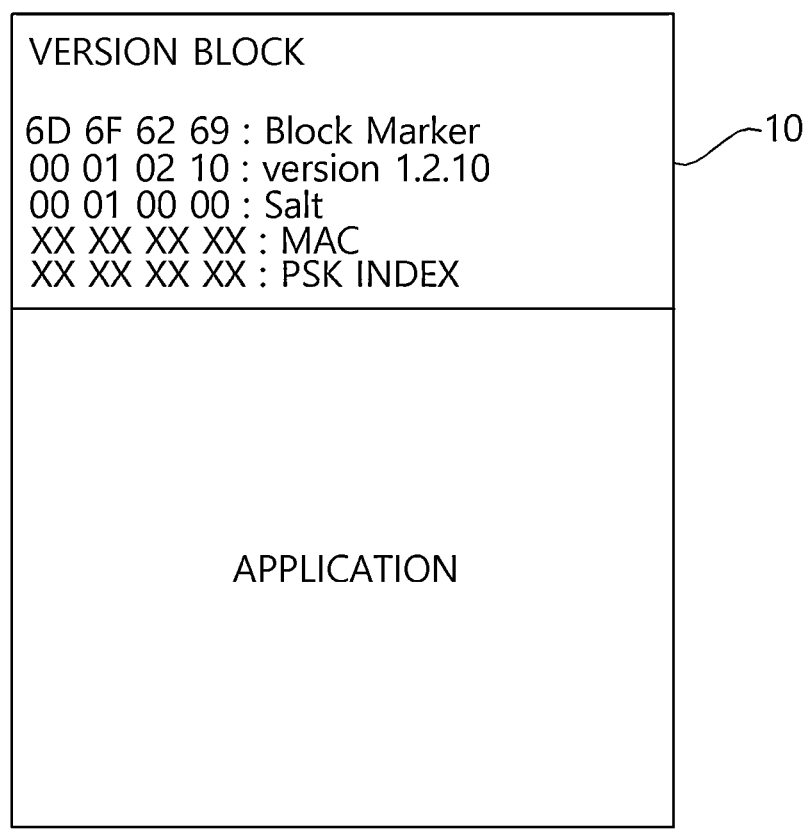
FIG. 2 illustrates a structure of firmware, according to an embodiment of the present disclosure.

FIG. 2 illustrates a structure of firmware, according to an embodiment of the present disclosure.

The firmware includes a version block 10 including the version information at an arbitrary position in the firmware. The version information, as a predetermined fixed value, may include a block marker indicating a start of the version block 10, a version value of the firmware, a salt value which may be a random value generated by the server 200, a message authentication code (MAC), and a pre-shared key (PSK) index. The server 200 and the HSM 130 share a list of PSKs corresponding to the PSK index. The message authentication code (MAC) is a code generated by using the PSK corresponding to the PSK index from the block marker, the version value, and the salt value by the server 200. When the block marker is a predetermined normal value, and the message authentication code (MAC) obtained from the block marker, the version value, and the salt value by using the PSK corresponding to the PSK index matches the message authentication code (MAC) of the version block 10, it may be confirmed that the version information is valid.

Figure 3:
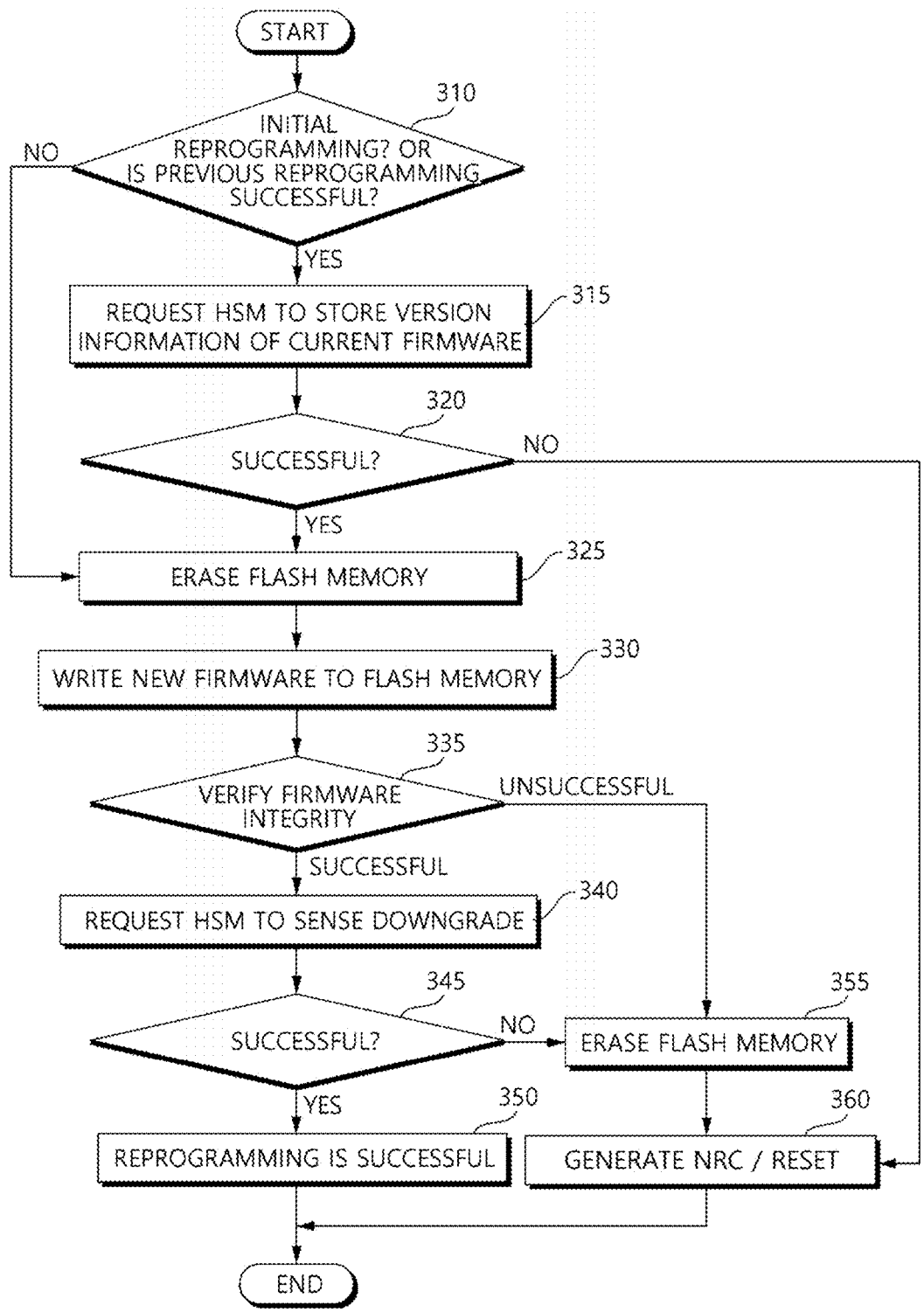
FIG. 3 is a flowchart illustrating an operation of a host core in a firmware update method, according to an embodiment of the present disclosure.

FIG. 3 is a flowchart illustrating operations of a host core 110 in a firmware update method, according to an embodiment of the present disclosure. The operations illustrated in the flowchart of FIG. 3 may be performed by the flash bootloader stored in the bootloader area 121 of the flash memory 120, according to another embodiment of the present disclosure.

In a step or operation 310, when firmware updated is started, the host core 110 determines whether this firmware update corresponds to initial programming or whether reprogramming is successful in the previous firmware update.

In a step or operation 315, when the firmware update is the initial reprogramming or the previous reprogramming is successful, the host core 110 requests the HSM 130 to store the version information of the current firmware stored in the flash memory 120. The host core 110 may transfer, to the HSM 130, the version information of the version block 10 of the current firmware stored in the flash memory 120.

Figure 4:
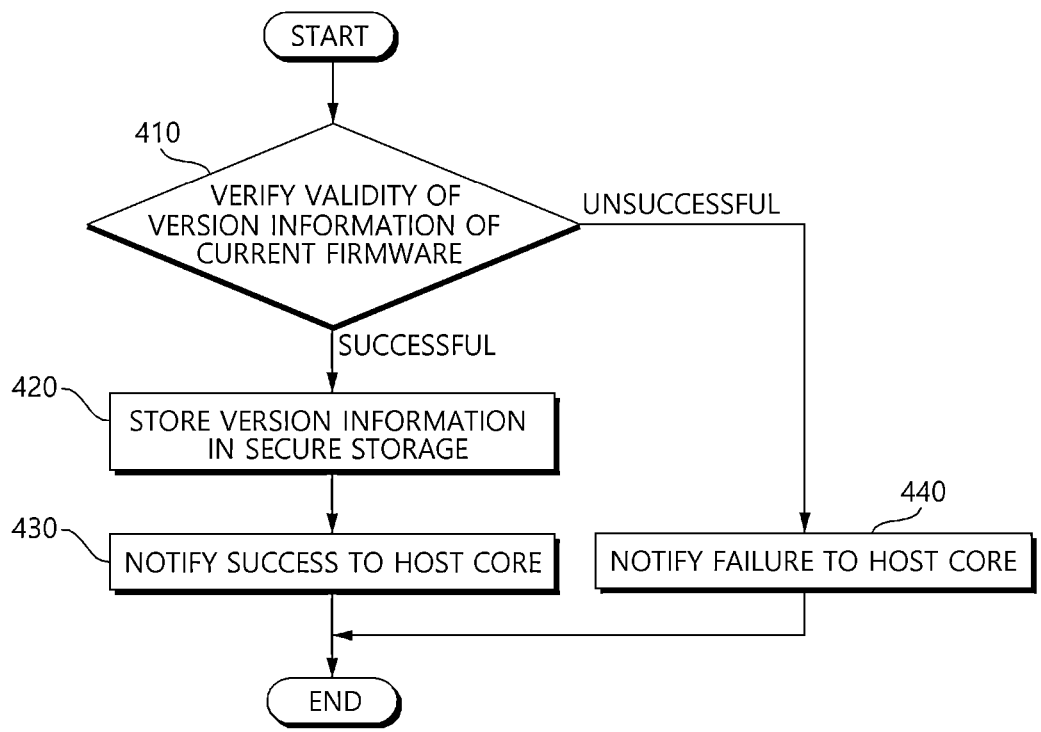
FIG. 4 is a flowchart illustrating a firmware version information storing operation of an HSM in the firmware update method, according to an embodiment of the present disclosure.

FIG. 4 is a flowchart illustrating a firmware version information storing operation of an HSM 130 in the firmware update method, according to an embodiment of the present disclosure.

In a step or operation 410, the HSM 130 verifies the validity of the version information of the current firmware. When the block marker of the version block 10 is a predetermined normal value and the message authentication code (MAC) obtained from the block marker, the version value, and the salt value by using the PSK corresponding to the PSK index matches the message authentication code (MAC) of the version block 10, the HSM 130 may determine that the version information is valid (verification is successful). When the block marker of the version block 10 is not the predetermined normal value and/or the message authentication code (MAC) obtained from the block marker, the version value, and the salt value by using the PSK corresponding to the PSK index does not match the message authentication code (MAC) of the version block 10, the HSM 130 may determine that the version information is not valid (verification is unsuccessful).

When the validity verification of the version information is unsuccessful, the HSM 130 notifies a failure to the host core 110 in a step or operation 440.

When the validity verification of the version information is successful, the HSM 130 stores the version information of the version block 10 of the current firmware in the secure storage 131 in a step or operation 420, and notifies a success to the host core 110 in a step or operation 430.

Referring back to FIG. 3, when a failure notification is received from the HSM 130 in a step or operation 320, the process proceeds to a step or operation 360, in which the host core 110 may generate a negative response code (NRC) and may be reset to confirm a reprogramming failure.

When a success notification is received from the HSM 130 in the step or operation 320, i.e., when the version information of the current firmware is stored by the HSM 130, the process proceeds to a step or operation 325, in which the host core 110 erases the flash memory 120 to remove the current firmware.

In a step or operation 330, the host core 110 writes new firmware downloaded to the flash memory 120.

In a step or operation step 335, the host core 110 verifies the integrity of the new firmware. The integrity of the firmware may be verified through an electronic signature included in the firmware as already known, for example.

When the integrity verification of the new firmware is unsuccessful in the step or operation 335, the process proceeds to a step or operation 355, in which the host core 110 erases the flash memory 120. In a step or operation 360, the host core 110 may generate the NRC and may be reset to confirm a reprogramming failure.

When integrity verification of the new firmware is successful in the step or operation 335, the host core 110 requests the HSM 130 to sense the downgrade of the new firmware in a step or operation 340. The host core 110 may transfer, to the HSM 130, the version information of the version block 10 of the new firmware stored in the flash memory 120.

Figure 5:
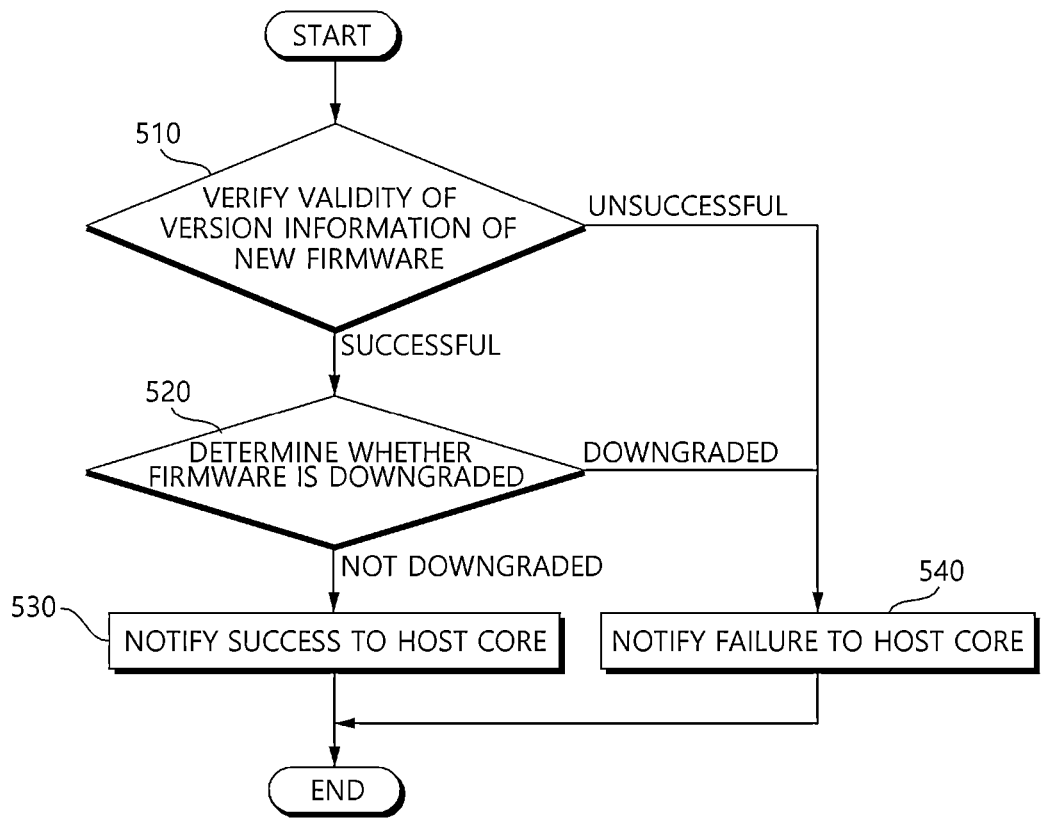
FIG. 5 is a flowchart illustrating a downgrade sensing operation of the HSM in the firmware update method, according to an embodiment of the present disclosure.

FIG. 5 is a flowchart illustrating a downgrade sensing operation of the HSM 130 in the firmware update method, according to an embodiment of the present disclosure.

In a step or operation 510, the HSM 130 verifies the validity of the version information of the new firmware. When the block marker of the version block 10 is a predetermined normal value and the message authentication code (MAC) obtained from the block marker, the version value, and the salt value by using the PSK corresponding to the PSK index matches the message authentication code (MAC) of the version block 10, the HSM may determine that the version information is valid (verification is successfully). When the block marker of the version block 10 is not the predetermined normal value and/or the message authentication code (MAC) obtained from the block marker, the version value, and the salt value by using the PSK corresponding to the PSK index does not match the message authentication code (MAC) of the version block 10, the HSM 130 may determine that the version information is not valid (verification is unsuccessful).

When the validity verification of the version information is unsuccessful, the HSM 130 sends a failure notification to the host core 110 in a step or operation 540.

When the validity verification of the version information is successful, in a step or operation 520, the HSM 130 compares the version information of the current firmware stored in the secure storage 131 and the version information of the new firmware to determine whether the firmware is downgraded. For example, when a version value of the new firmware is equal to or greater than a version value of the current firmware, it may be determined that the firmware is not downgraded.

When it is determined that the firmware is downgraded in the step or operation 520, the HSM 130 sends a failure notification to the host core 110 in step 540.

When it is determined that the firmware is not downgraded in the step or operation 520, the HSM 130 sends a success notification to the host core 110 in a step or operation 530.

Referring back to FIG. 3, when a failure notification is received from the HSM 130 in a step or operation 345, i.e., when the validity verification of the version information of the new firmware is unsuccessful or the firmware is downgraded by the HSM 130, the process proceeds to a step or operation 355, in which the host core 110 erases the flash memory 120. In a step or operation 360, the host core 110 may generate a negative response code (NRC) and may be reset to confirm the reprogramming failure.

When a success notification is received from the HSM 130 in the step or operation 345, i.e., when it is determined that the firmware is not downgraded by the HSM 130, the HSM 130 confirms the reprogramming success, and the firmware update is terminated in a step or operation 350.

In the step or operation step 310, when the reprogramming is unsuccessful in the previous firmware update, the firmware of the flash memory 120 is not normally reprogrammed while the version information is stored in the secure storage 131 of the HSM 130. In this case, the host core 110 does not request the HSM 130 to store the version information of the current firmware, but immediately proceeds to step 325 to erase the flash memory 120.

Figure 6:
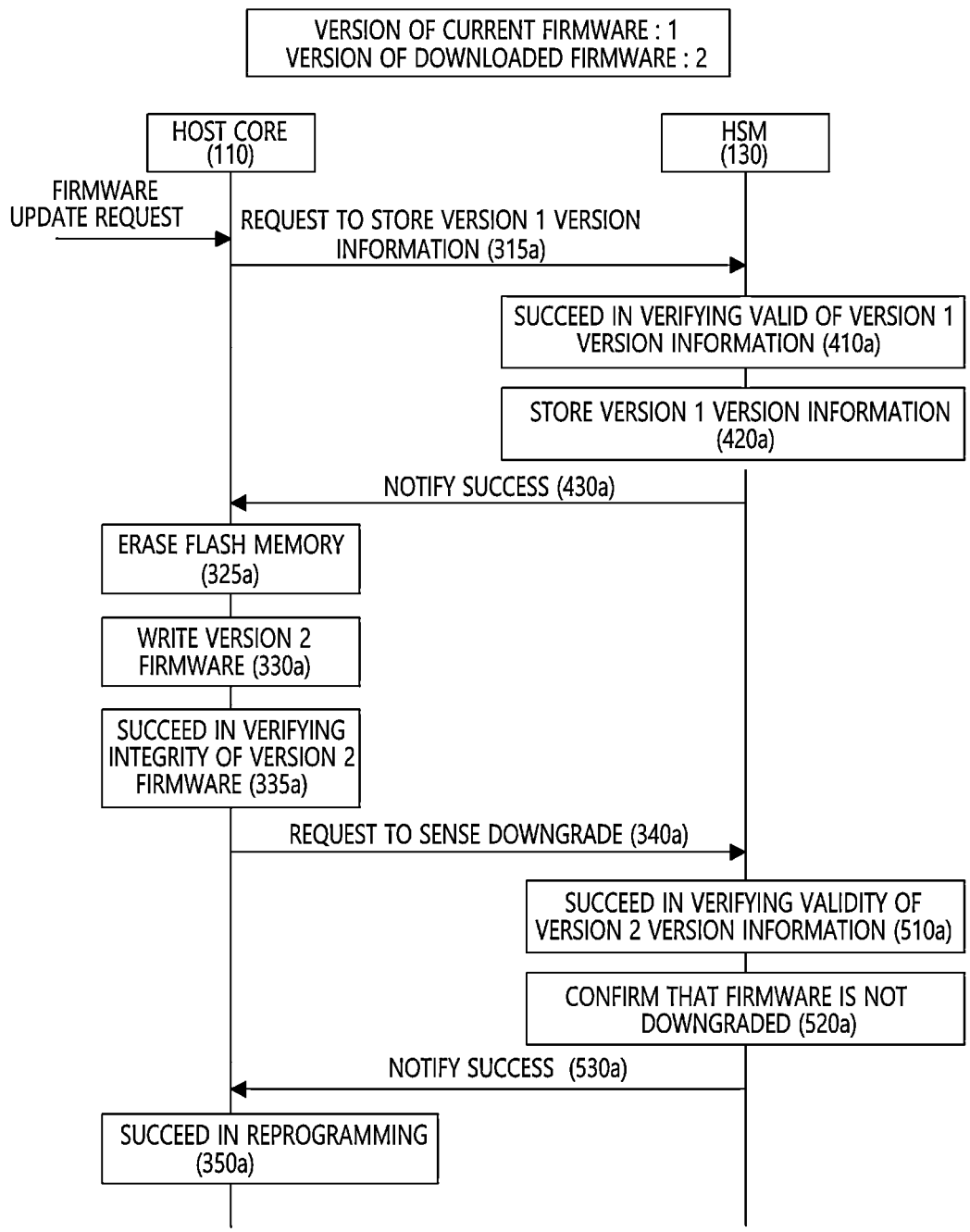
FIG. 6 illustrates an example of a process of performing firmware update, according to an embodiment of the present disclosure.

FIG. 6 illustrates an example of a process of performing the firmware update, according to an embodiment of the present disclosure. In particular, FIG. 6 illustrates an example in which the version of the current firmware stored in the flash memory 120 is 1 and the version of the new firmware downloaded is 2.

When the firmware update is requested, the host core 110 requests the HSM 130 to store version information of version 1 firmware stored in the flash memory 120 in a step or operation 315a.

When, in a step or operation 410a, the validity verification of the version information of version 1 firmware is successful, the HSM 130 stores the version information of the version 1 firmware in the secure storage 131 in a step or operation 420a. The HSM 130 sends a success notification to the host core 110 in a step or operation 430a.

The host core 110 erases the flash memory 120 to remove the version 1 firmware in a step or operation 325a, and writes downloaded version 2 firmware to the flash memory 120 in a step or operation 330a.

When integrity verification of the version 2 firmware is successful in a step or operation 335a, the host core 110 requests the HSM 130 to sense the downgrade of the version 2 firmware in a step or operation 340a.

When the validity verification of the version information of the version 2 firmware is successful in a step or operation 510a, the HSM 130 compares a version value of the version 2 firmware and a version value of the version 1 firmware stored in the secure storage 131 to confirm that the firmware is not downgraded in a step or operation 520a. The HSM 130 sends a success notification to the host core 110 in a step or operation 530a.

When the success notification is received from the HSM 130, the host core 110 confirms the reprogramming success in a step or operation 350a.

Figure 7:
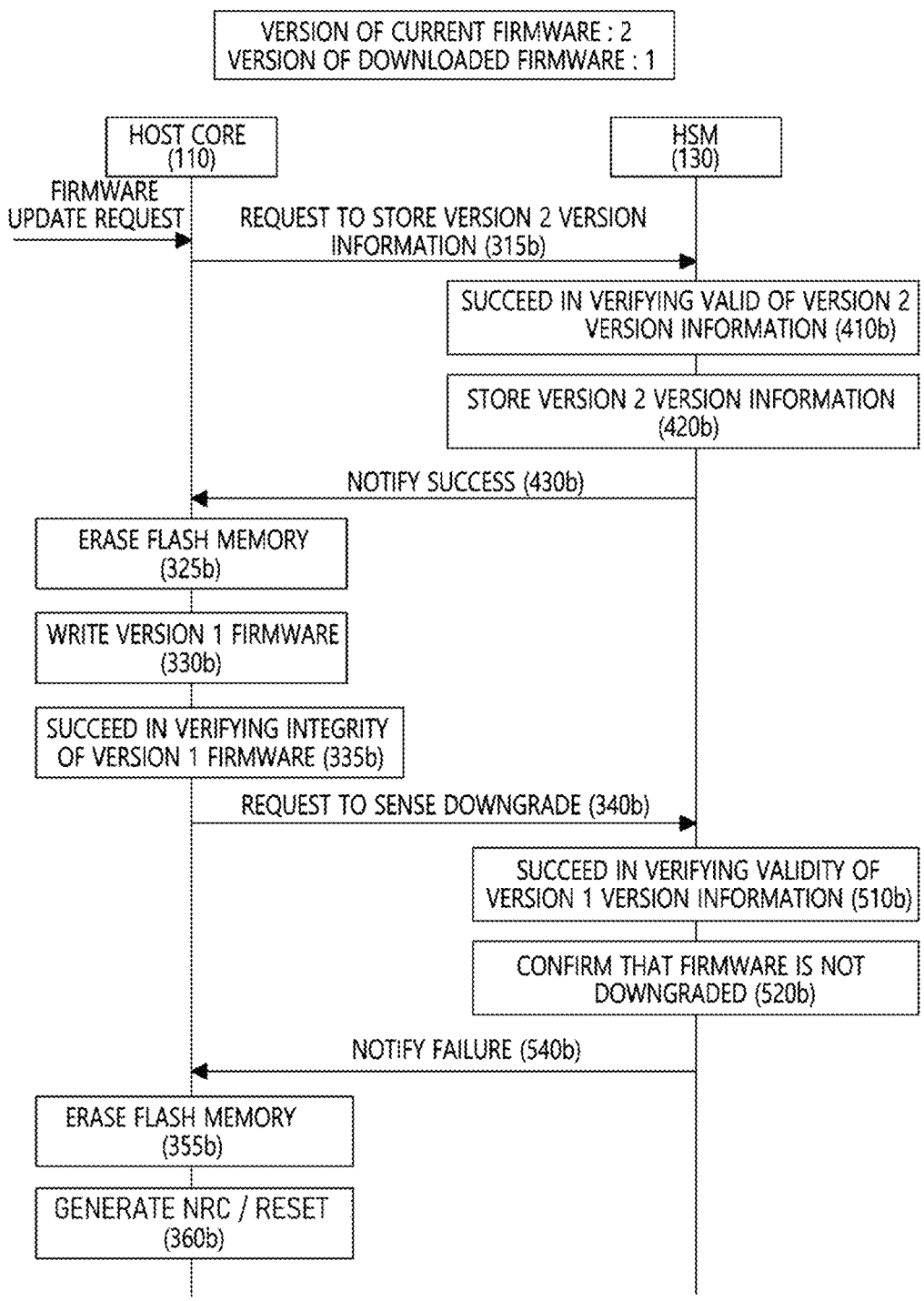
FIG. 7 illustrates another example of the process of performing firmware update, according to an embodiment of the present disclosure.

FIG. 7 illustrates another example of the process of performing the firmware update, according to an embodiment of the present disclosure. In particular, FIG. 7 illustrates an example in which the version of the current firmware stored in the flash memory 120 is 2 and the version of the new firmware downloaded is 1.

When the firmware update is requested, the host core 110 requests the HSM 130 to store the version information of the version 2 firmware stored in the flash memory 120 in a step or operation 315b.

When the validity verification of the version information of the version 2 firmware is successful in a step or operation 410b, the HSM 130 stores the version information of the version 2 firmware in the secure storage 131 in a step or operation 420b. The HSM 130 sends a success notification to the host core 110 in a step or operation 430b.

The host core 110 erases the flash memory 120 to remove the version 2 firmware in a step or operation 325b, and writes downloaded version 1 firmware to the flash memory 120 in a step or operation 330b.

When integrity verification of the version 1 firmware is successful in a step or operation 335b, the host core 110 requests the HSM 130 to sense the downgrade of the version 1 firmware in a step or operation 340b.

When the validity verification of the version information of the version 1 firmware is successful in a step or operation 510b, the HSM 130 compares the version value of the version 1 firmware and the version value of the version 2 firmware stored in the secure storage 131 to confirm that the firmware is downgraded in a step or operation 520b. Therefore, the HSM 130 notifies the failure to the host core 110 in a step or operation 540b.

When the failure is notified from the HSM 130, the host core 110 erases the flash memory 120 in a step or operation 355b. The host core 110 generates the NRC and is reset in a step or operation 360b.

Figure 8:
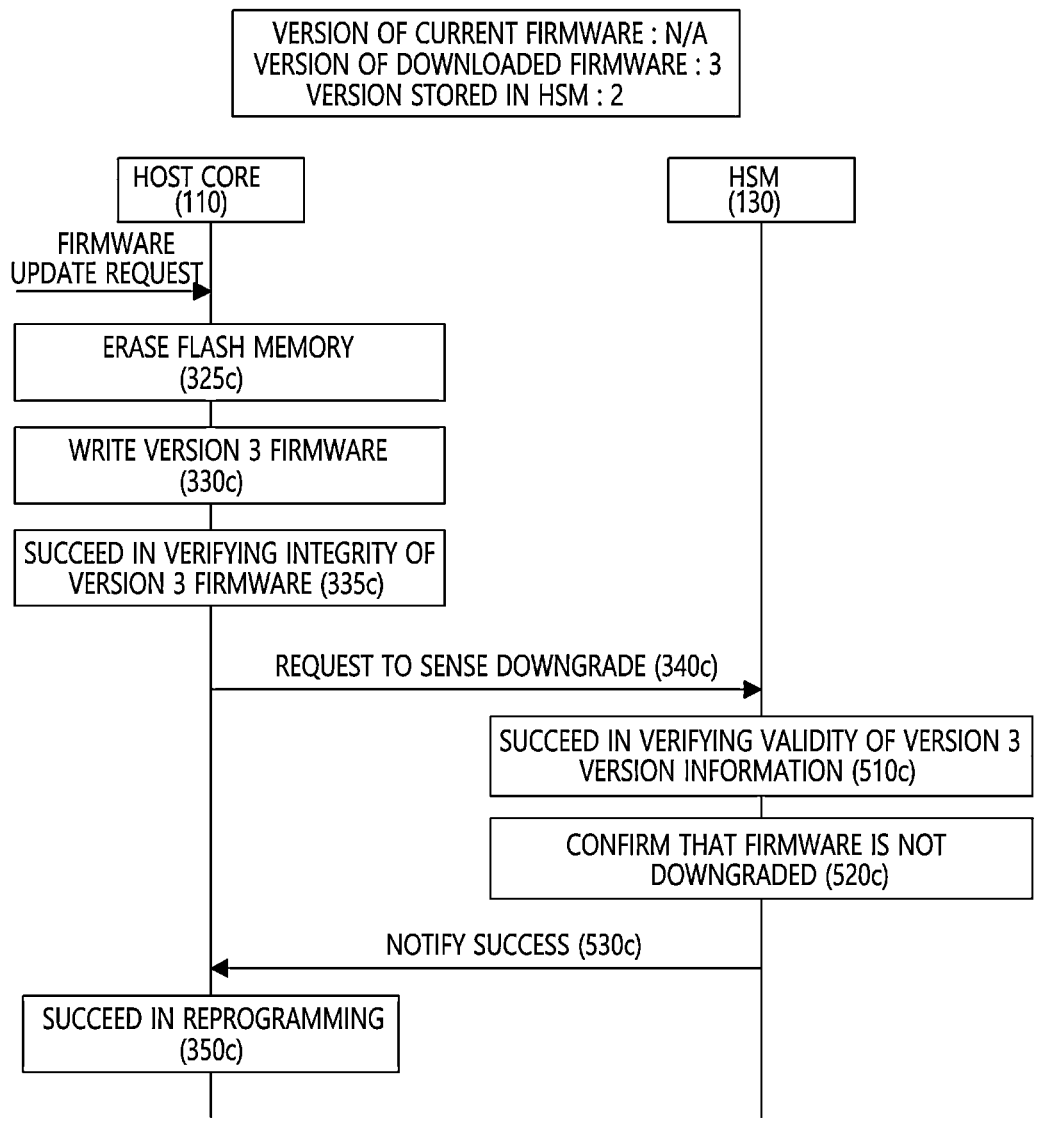
FIG. 8 illustrates yet another example of the process of performing firmware update, according to an embodiment of the present disclosure.

FIG. 8 illustrates yet another example of the process of performing the firmware update, according to an embodiment of the present disclosure. In particular, FIG. 8 illustrates an example in which a version of new firmware downloaded is 3 in a state in which the version information of the version 2 firmware is stored in the secure storage 131 of the HSM 130 and the firmware of the flash memory 120 is removed through the process of FIG. 7.

When the firmware update is requested, the reprogramming is unsuccessful in the previous firmware update (the process of FIG. 7), so the host core 110 erases the flash memory 120 without requesting the HSM 130 to store the version information of the current firmware in a step or operation 325c.

The host core 110 writes version 3 firmware downloaded to the flash memory 120 in a step or operation 330c.

When integrity verification of the version 3 firmware is successful in a step or operation 335c, the host core 110 requests the HSM 130 to sense the downgrade of the version 3 firmware in a step or operation 340c.

When the validity verification of the version information of the version 3 firmware is successful in a step or operation 510c, the HSM 130 compares a version value of the version 3 firmware and the version value of the version 2 firmware stored in the secure storage 131 to confirm that the firmware is not downgraded in a step or operation 520c. The HSM 130 sends a success notification to the host core 110 in a step or operation 530c.

When the success notification is received from the HSM 130, the host core 110 confirms the reprogramming success in a step or operation 350c.

Figure 9:
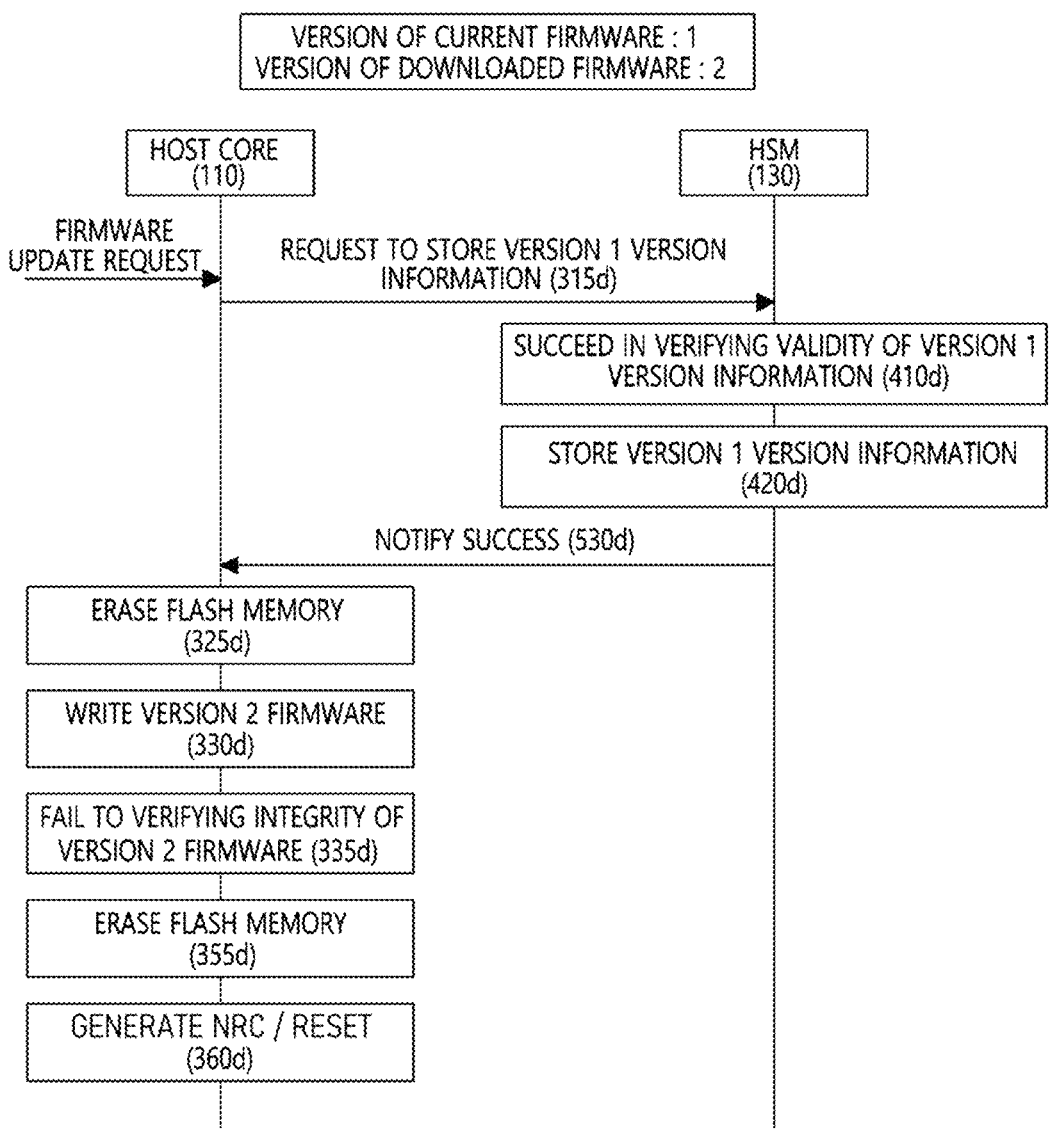
FIG. 9 illustrates still yet another example of the process of performing firmware update, according to an embodiment of the present disclosure.

FIG. 9 illustrates still another example of the process of performing the firmware update, according to an embodiment of the present disclosure. In particular, FIG. 9 illustrates an example in which the version of the current firmware stored in the flash memory 120 is 1, the version of the new firmware downloaded is 2, and the integrity verification of the version 2 firmware is unsuccessful.

When the firmware update is requested, the host core 110 requests the HSM 130 to store the version information of the version 1 firmware stored in the flash memory 120 in a step or operation 315d.

When the validity verification of the version information of the version 1 firmware is successful in a step or operation 410d, the HSM 130 stores the version information of the version 1 firmware in the secure storage 131 in a step or operation 420d. The HSM 130 sends a success notification to the host core 110 in a step or operation 430d.

The host core 110 erases the flash memory 120 to remove the version 1 firmware in a step or operation 325d, and writes downloaded version 2 firmware to the flash memory 120 in a step or operation 330d.

When the integrity verification of the version 2 firmware is unsuccessful (335d), the host core 110 erases the flash memory 120 in a step or operation 335d. The host core 110 generates the NRC and is reset in a step or operation 360d.

Figure 10:
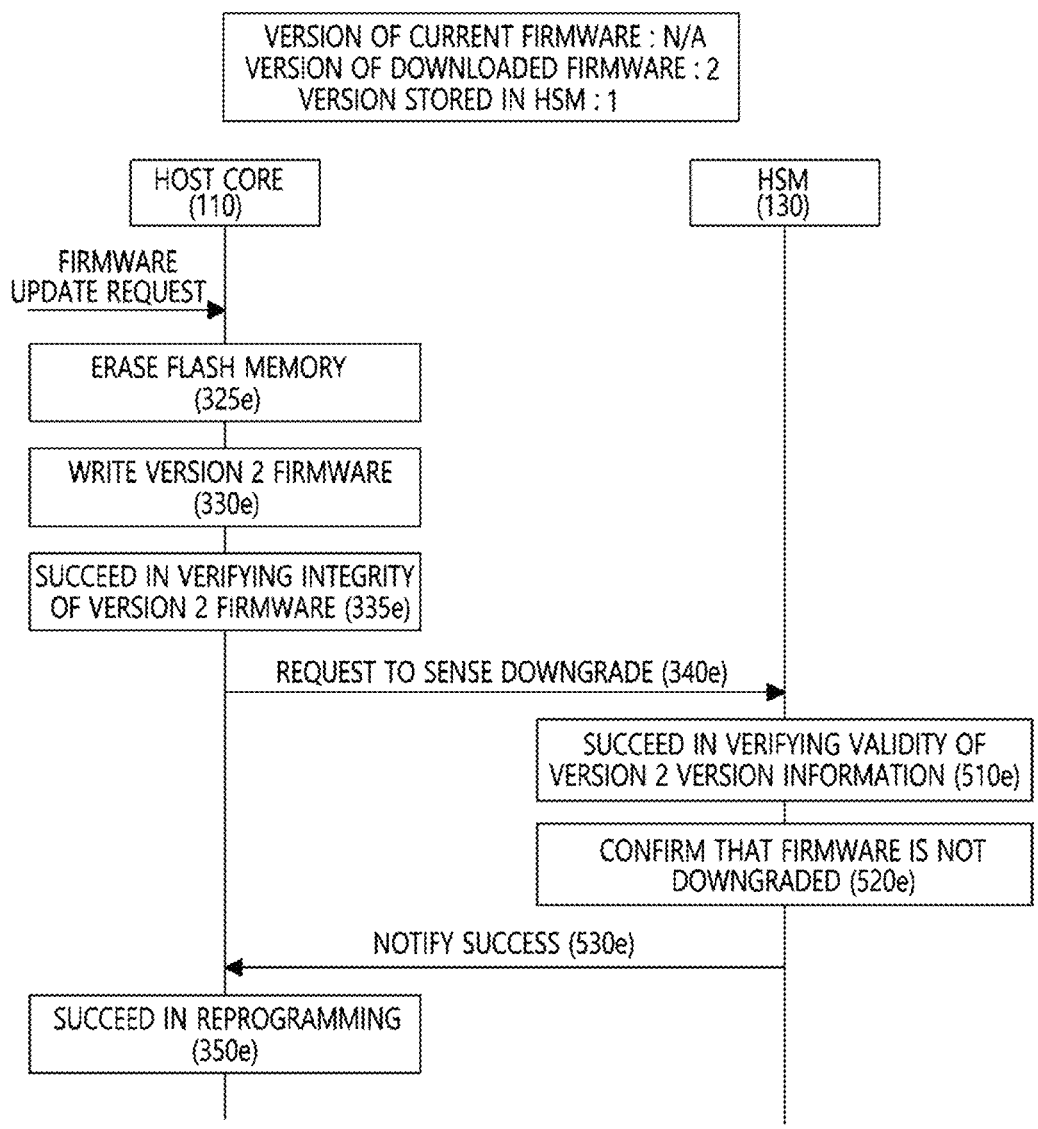
FIG. 10 illustrates still yet another example of the process of performing firmware update, according to an embodiment of the present disclosure.

FIG. 10 illustrates yet another example of the process of performing the firmware update, according to an embodiment of the present disclosure. In particular, FIG. 10 illustrates an example in which a version of new firmware downloaded is 2 in a state in which the version information of the version 1 firmware is stored in the secure storage 131 of the HSM 130 and the firmware of the flash memory 120 is removed through the process of FIG. 9.

When the firmware update is requested, the reprogramming is unsuccessful in the previous firmware update (the process of FIG. 9). Accordingly, in a step or operation 325e, the host core 110 erases the flash memory 120 without requesting that the HSM 130 store the version information of the current firmware.

The host core 110 writes version 2 firmware downloaded to the flash memory 120 in a step or operation 330e.

When integrity verification of the version 2 firmware is successful in a step or operation 335e, the host core 110 requests the HSM 130 to sense the downgrade of the version 2 firmware in a step or operation 340e.

When the validity verification of the version information of the version 2 firmware is successful in a step or operation 510e, the HSM 130 compares the version value of the version 2 firmware and the version value of the version 1 firmware stored in the secure storage 131 to confirm that the firmware is not downgraded in a step or operation 520e, The HSM 130 sends success notification to the host core 110 in a step or operation 530e.

When the success notification is received from the HSM 130, the host core 110 confirms the reprogramming success in a step or operation 350e.

Combinations of various blocks in the block diagrams in the accompanying drawings and each step or operation of the flowcharts in the accompanying drawings may be implemented by computer program instructions. The computer program instructions may be loaded in a universal computer, a special computer or a processor of other programmable data processing equipment, so that the instructions performed by the computer or a processor of other programmable data processing equipment may provide a means of performing functions described in each block of the block diagram or each step of the flowchart. The computer program instructions may also be stored in a computer usable or computer readable memory which may direct a computer or other programmable data processing equipment in order to implement a function in a specific scheme, the instructions stored in the computer usable or computer readable memory can also produce manufacturing items including an instruction means performing a function described in each block of the block diagram or each step in the flowchart. The computer program instructions can also be loaded in the computer or other programmable data processing equipment the computer or other programmable data processing equipment may execute the instructions to cause the computer or other programmable data processing equipment to perform a series of operational steps for implementing the functions described in each block of the block diagram or each step in the flowchart.

Each block or each step may represent a part of a module, a segment, or a code that includes one or more executable instructions for executing a specified logical function(s). It should also be noted that in some alternative embodiments, the functions mentioned in the blocks or steps may occur in a different order. For example, two successive blocks or steps illustrated may in fact be performed substantially concurrently or the blocks or steps may be sometimes performed in a reverse order according to the corresponding function.

Embodiments of the present disclosure have been described and illustrated in the drawings and the specification. The embodiments were chosen and described in order to explain certain principles of the disclosure and their practical application, to thereby enable those having ordinary skill in the art to make and utilize various embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, should be apparent to those having ordinary skill in the art. Many changes, modifications, variations and other uses and applications of the present disclosure should become apparent to those having ordinary skill in the art after considering the specification and the accompanying drawings. All such changes, modifications, variations and other uses and applications which do not depart from the spirit and scope of the disclosure should be deemed to be covered by the present disclosure which is limited only by the claims which follow.

What is claimed is:

1. A firmware update method, comprising: requesting a hardware security module (HSM) to store version information of a current firmware stored in a flash memory;
storing, by the HSM, the version information of the current firmware;
erasing the flash memory when the version information of the current firmware is stored by the HSM;
writing new downloaded firmware to the flash memory;
requesting the HSM to sense downgrade of the new firmware when the integrity of the new firmware is verified;
based on comparison, by the HSM, of the stored version information and the version information of the new firmware, terminating the firmware update by the HSM as part of confirming a reprogramming success when the firmware is not downgraded by the HSM, and
based on comparison, by the HSM, of the stored version information and the version information of the new firmware, erasing the flash memory and generating a negative response code (NRC) as part of confirming a reprogramming failure when the firmware is downgraded by the HSM.

2. The firmware update method of claim 1, further comprising:
erasing the flash memory when the integrity is not verified.

3. The firmware update method of claim 1, wherein storing the version information of the current firmware by the HSM comprises storing the version information of the current firmware in a secure storage.

4. The firmware update method of claim 1, further comprising:
prior to storing the version information of the current firmware by the HSM, verifying, by the HSM, validity of the version information of the current firmware.

5. The firmware update method of claim 4, wherein:
the version information includes a version value, a salt value, a message authentication code (MAC), and a pre-shared key (PSK) index, and
verifying the validity of the version information comprises verifying the validity by using PSKs corresponding to the version value, the salt value, the MAC, and the PSK index.

6. The firmware update method of claim 1, further comprising:
prior to determining whether the firmware is downgraded by the HSM, verifying, by the HSM, the validity of version information of the new firmware.

7. The firmware update method of claim 6, wherein:
the version information includes a version value, a salt value, a message authentication code (MAC), and a pre-shared key (PSK) index, and
verifying the validity of the version information comprises verifying the validity by using PSKs corresponding to the version value, the salt value, the MAC, and the PSK index.

8. A firmware update apparatus, comprising:
a host core configured to perform firmware update of a flash memory;
the flash memory and
a hardware security module (HSM),
wherein:
the host core is configured to request the HSM to store version information of current firmware stored in the flash memory when requesting the firmware update,
the HSM is configured to store the version information of the current firmware in response to the request of the host core,
the host core is configured to, when the version information of the current firmware is stored by the HSM, erase the flash memory, write new firmware downloaded to the flash memory, and request the HSM to sense downgrade of the new firmware when the integrity is verified,
based on comparison of the stored version information and the version information of the new firmware, the host core is configured to terminate the firmware update by the HSM as part of confirming a reprogramming success when the firmware is not downgraded by the HSM, and
based on comparison, by the HSM, of the stored version information and the version information of the new firmware, the host core is configured to erase the flash memory and generate a negative response code (NRC) as part of confirming a reprogramming failure when the firmware is downgraded by the HSM.

9. The firmware update apparatus of claim 8, wherein the host core is configured to, when the integrity is not verified, erase the flash memory.

10. The firmware update apparatus of claim 8, wherein the HSM is configured to store the version information of the current firmware in a secure storage.

11. The firmware update apparatus of claim 8, wherein the HSM is configured to, prior to storing the version information of the current firmware, verify validity of the version information of the current firmware.

12. The firmware update apparatus of claim 11, wherein:
the version information includes a version, a salt value, a message authentication code (MAC), and a pre-shared key (PSK) index, and
the HSM is configured to verify the validity of the version information by using PSKs corresponding to the version, the salt value, the MAC, and the PSK index.

13. The firmware update apparatus of claim 8, wherein the HSM is configured to, prior to determining whether the firmware is downgraded, verify validity of version information of the new firmware.

14. The firmware update apparatus of claim 13, wherein:
the version information includes a version, a salt value, a message authentication code (MAC), and a pre-shared key (PSK) index, and
the HSM is configured to verify the validity of the version information by using PSKs corresponding to the version, the salt value, the MAC, and the PSK index.

15. The firmware update apparatus of claim 8, wherein the host core is configured to eras the flash memory without requesting the HSM to store the version information of the current firmware stored in the flash memory when reprogramming is unsuccessful in previous firmware update when the firmware update is requested.

* * * * *